United States Patent [19]

Ford et al.

[11] 4,182,017
[45] Jan. 8, 1980

[54] METHOD AND APPARATUS FOR TERMINATING OPTICAL FIBRES

[75] Inventors: Mark W. Ford, Barnhurst; Thomas B. Wearden, Bromley, both of England

[73] Assignee: Lee Green Precision Industries Ltd., London, England

[21] Appl. No.: 889,086

[22] Filed: Mar. 22, 1978

[30] Foreign Application Priority Data

Mar. 24, 1977 [GB] United Kingdom ............... 12533/77

[51] Int. Cl.² .......................................... B23P 19/00
[52] U.S. Cl. .................. 29/428; 29/630 A; 83/171; 219/68; 350/96.21
[58] Field of Search ............. 29/445, 428, 630 A; 83/171, 13; 219/68; 350/96.20, 96.21

[56] References Cited

U.S. PATENT DOCUMENTS

| | | | |
|---|---|---|---|
| 1,905,366 | 4/1933 | Carlin | 83/171 |
| 2,643,579 | 6/1953 | Jacoby | 83/171 X |
| 2,961,521 | 11/1960 | Zack | 219/68 |
| 3,483,778 | 12/1969 | Forthmann | 83/171 X |
| 3,587,377 | 6/1971 | Olson | 83/171 |
| 3,783,065 | 1/1974 | Stone | 350/96.21 X |
| 3,928,903 | 12/1975 | Richardson et al. | 29/445 X |
| 3,984,172 | 10/1976 | Miller | 350/96.21 X |
| 4,062,620 | 12/1977 | Pirolli | 350/96.21 X |
| 4,084,308 | 4/1978 | Runge | 350/96.20 X |
| 4,088,390 | 5/1978 | McCartney | 350/96.21 |

FOREIGN PATENT DOCUMENTS 583224 12/1946 United Kingdom ..................... 83/171

*Primary Examiner*—Charlie T. Moon
*Attorney, Agent, or Firm*—Pollock, Vande Sande and Priddy

[57] ABSTRACT

A method and apparatus for terminating optical fibres. In the method, the fibre is threaded through a tubular ferrule so that the end of the fibre projects from an end face of the ferrule, and a heated cutting edge is swept across the end face of the ferrule at a predetermined rate. This produces a cut end for the fibre with a minimum of scratches, roughness, distortion, stress or discoloration without the need for subsequent grinding or polishing. The apparatus disclosed is particularly intended for performing the above method and comprises a jig adapted to receive the tubular ferrule and a fixed heated blade. The jig is arranged to be movable freely under the action of gravity with the end face of the ferrule maintained in sliding engagement with the blade whereby the cutting edge thereof is swept across the end face at the predetermined rate.

10 Claims, 6 Drawing Figures

METHOD AND APPARATUS FOR TERMINATING OPTICAL FIBRES

BACKGROUND OF THE INVENTION

This invention relates to a method and apparatus for terminating optical fibres.

In methods of terminating optical fibres of glass and like relatively hard materials, the fibre is threaded through a ferrule, and the fibre is cut at a point adjacent the ferrule. The ferrule may serve, for example as part of a connector assembly for mechanically connecting and optically coupling the terminated fibre with another similarly terminated fibre, or as part of a transmitter or receiver assembly for mechanically connecting and optically coupling the terminated fibre with a light emitting or receiving device. In any case, to obtain sufficient optical coupling with the fibre, the end of the fibre must at least be clean, smooth and substantially flat. Accordingly, it is common practice to grind and polish the fibre-end after cutting.

In the case of optical fibres of polymer material, the material is frequently too soft to be successfully ground and polished. Moreover, even in the case of optical fibres of glass and like relatively hard materials, the grinding and polishing process can degrade the optical transmission properties of the end of the fibre. Thus, particles of foreign material, for example particles of metal ground away from the end of the ferrule or like member supporting the fibre, can become embedded in the end of the fibre and the grinding and polishing process can often cause stresses and distortion in the molecular structure of the material immediately below the polished surface. Accordingly, even though a surface which has been polished optically flat might have excellent reflection characteristics, it may not necessarily have good transmission characteristics.

SUMMARY OF THE INVENTION

It is an object of the present invention to provide a method and apparatus which can produce a cut end for an optical fibre with a minimum of scratches, roughness, distortion, stress or discolouration and without the need for subsequent grinding or polishing.

From one aspect, the present invention provides a method of terminating optical fibre means, the method comprising the steps of threading the fibre means through a tubular ferrule so that said fibre means projects from an end face of said ferrule, and sweeping the cutting edge of cutting means across the said end face and in engagement therewith to sever said fibre means substantially flush with said end face, said cutting edge being heated to a temperature in excess of the softening range of the material of said fibre means. Preferably, said cutting edge is swept across said end face at a predetermined rate under the action, for example, of a falling weight or a pre-loaded spring. Preferably, said cutting means is fixed with said cutting edge uppermost and said ferrule is received by a jig which can be raised to a position with said bore extending in a generally horizontal direction above the line of said cutting edge and said end face extending generally vertically and in engagement with said cutting edge. The cutting edge is swept across said end face to sever said fibre means by permitting said jig to fall substantially freely to a lower position in which said bore extends generally in a horizontal direction below the line of said cutting edge.

From another aspect, the invention provides apparatus for terminating optical fibre means, the apparatus comprising a jig suitable for receiving a tubular ferrule, cutting means formed with a cutting edge, said jig and cutting means being relatively movable between first and second positions and arranged so as to be urged for relative movement from said first to said second positions with said cutting edge in sliding engagement with an end face of a ferrule received in said jig, means for heating said cutting edge to a temperature in excess of the softening range of the material of the fibre means, and means arranged to move said jig and cutting means to said first relative position and releasable to permit said jig and cutting means to return to said second relative position whereby, in use, to sweep said cutting edge across the end face of a ferrule received in said jig and sever substantially flush with said end face optical fibre means threaded through the bore of the ferrule.

Preferably, said cutting means is fixed with said cutting edge uppermost and said jig is vertically movable between said first and second positions relative to said cutting means, said first and second positions being upper and lower positions respectively and said jig being urged for movement from said first to said second positions by its own weight. The jig is arranged to receive the ferrule with the bore thereof extending in a generally horizontal direction which is above and below the line of said cutting edge when said jig is in said upper and lower positions respectively. Preferably said jig includes a spring mechanism to press the end face of the ferrule against said cutting edge to maintain positive sliding engagement therebetween. Preferably, said cutting means comprises a metal blade and said means for heating said cutting edge comprises an electric current source connected with said blade for energization to pass a current therethrough sufficient to heat said cutting edge to said temperature.

DESCRIPTION OF THE ILLUSTRATED EMBODIMENT

In order that the invention may be clearly understood and readily carried into effect, a method and apparatus in accordance with the invention will now be described by way of example with reference to the accompanying drawings, wherein.

Figure 1:
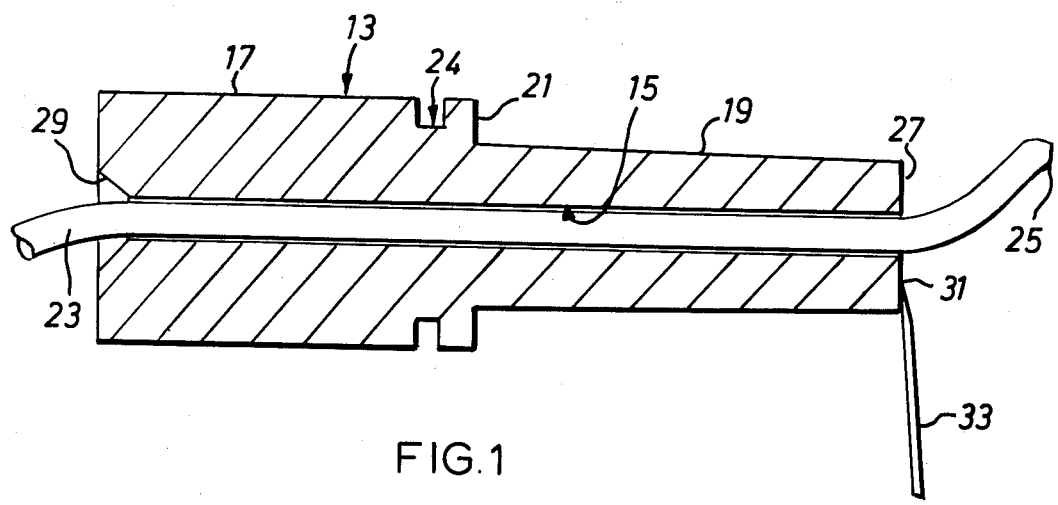
FIG. 1 illustrates a tubular ferrule suitable for use in a method in accordance with the present invention.

FIG. 1 illustrates a tubular ferrule suitable for use in a method in accordance with the present invention for terminating an optical fibre. The ferrule 13 is formed by a generally cylindrical member of nickel-silver provided with an axial bore 15, the member comprising body and shank portions 17 and 19 of greater and lesser diameters respectively separated by an annular shoulder 21, and an annular groove 24 in the portion 17 adjacent the shoulder 21.

Optical fibre means comprising, in the example illustrated, a single-filament fibre 23, is terminated by threading the free end 25 of the fibre through the bore 15 of the ferrule so that the fibre projects from a planar transverse end face 27 of the ferrule. To secure the fibre 23 against subsequent axial movement in the ferrule, a small quantity of epoxy resin or like adhesive can be deposited in the counter-sunk end 29 of the bore 15 before the fibre is threaded through the bore, and the fibre held in position by other means until the resin has had an opportunity to set. Alternatively, and particularly in the case of the optical fibre means being provided with a protective sheath (not present in the illustrated example), the fibre can be secured against axial movement in the ferrule by means of a short length of heat-shrinkable tubing arranged to embrace the end of the ferrule and the adjacent portion of the fibre means opposite the end face 27.

Spring means (not illustrated) is arranged to press the end face 27 of the ferrule against the cutting edge 31 of a heated blade to maintain positive engagement therebetween. The blade, or at least the portion of the blade adjacent the fibre 23, is heated to a temperature substantially above the softening range of the material of the fibre 23. The cutting edge of the blade is then swept across the end face 27 of the ferrule at a predetermined rate to sever the fibre 23 substantially flush with the end face 27.

The temperature of the blade and the cutting rate, that is to say the rate at which the blade is swept across the end face 27, determine the optical transmission quality of the resulting severed end of the optical fibre. If the combination of values of those parameters is suitably selected in accordance with the material and dimensions of the fibre, a surface can be obtained which is clean, smooth and substantially flat and moreover, substantially free from internal stresses or distortion. In short, a surface with good optical transmission characteristics can be obtained. If the blade is driven too rapidly or the cutting temperature is insufficient, the severed end of the optical fibre can be distorted, scratched and rough; on the other hand, if the blade is driven too slowly or the cutting temperature of the blade is too high the material of the fibre can be subjected to excessive melting causing unevenness and/or discolouration of the severed end of the fibre.

The particular apparatus described below by way of example with reference to FIGS. 2, 3 and 4A–4C provides in use a combination of values of the above-mentioned parameters suitable for severing optical fibres having diameters of up to at least 0.040" and comprising a polystyrene core with a methyl methacrylate cladding.

Figure 2:
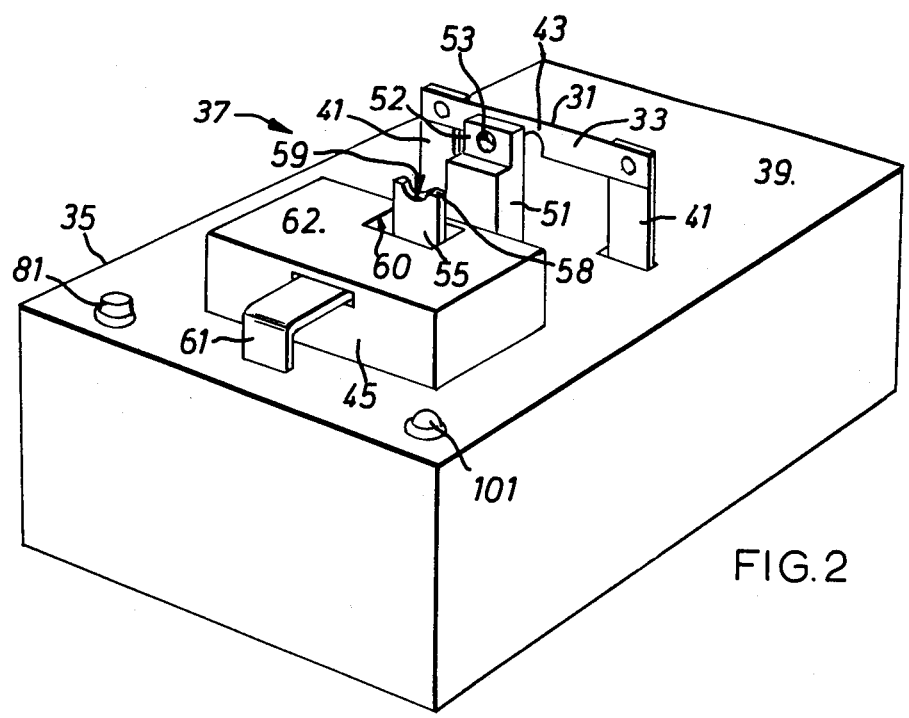
FIG. 2 is a general perspective view of apparatus in accordance with the present invention.

Referring to the perspective view of FIG. 2, the apparatus comprises a main housing 35 with a vertically movable jig 37 and a fixed heated blade 33 mounted on the top 39 of the housing. The blade 33, of 0.016" thick stainless steel, is secured and electrically connected at its end to upstanding electrodes 41. The electrodes 41 are electrically connected with respective terminals of an electric current source (not shown) within the housing 35 for energization in use to pass an electric current through the blade 33 to heat the blade. The center portion of the lower edge of the blade is cut with a semi-circular notch to provide a restricted region 43, having a relatively high resistance, which is heated to a dull cherry-red colour, that is to say, to a temperature of the order of 700° C., by passage of the electric current. The upper edge 31 of the blade forms a cutting edge.

Figure 3:
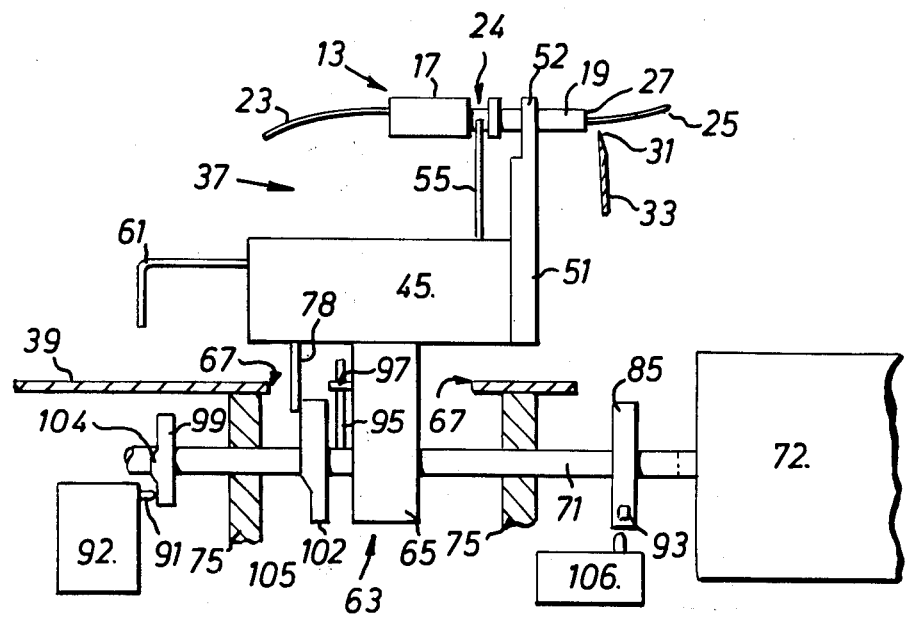
FIG. 3 is a schematic and partly sectioned side view of part of the apparatus of FIG. 2.

The jig 37 comprises a rectangular steel body 45 arranged for vertical movement relative to the top 39 of the housing 35. A main support post 51 is secured to the rear of the body 45 adjacent the blade 33 and is formed at its upper end 52 with a circular hole 53 for receiving the shank portion 19 of a ferrule received by the jig (as shown in FIG. 3). A spring-loaded support post 55 is located in front of the post 51 and is formed at its upper end 58 with a semicircular cut-out 59 whereby the end 58 can be engaged in the annular groove 23 of a ferrule received by the jig (as shown in FIG. 3) so that the ferrule is supported with its bore extending in a generally horizontal direction transverse to the line of the cutting edge 31.

The post 55 projects through an aperture 60 in the top 62 of the body 45, and is supported by means (not shown) within the body 45 to permit horizontal movement thereof towards and away from the post 51 and blade 33. A spring mechanism (not shown) within the body 45 is arranged to bias the post 55 in the direction towards the post 51 and blade 33 so that the end 27 of a ferrule 13 received in the jig 37 (as shown in FIG. 3) is pressed into positive engagement with the cutting edge 31 of the blade 33. A handle 61 projecting from the front of the body 45 is connected to the post 55 to permit convenient manual movement thereof against the action of the spring mechanism.

Referring to the schematic and partly sectioned side view of FIG. 3, vertical movement of the jig 37 is effected by means of a camming mechanism 63 disposed within the housing 35. The camming mechanism comprises a synchronous electric motor 72 coupled with a drive shaft 71, and a camming wheel 65 which is freely rotatable on the shaft 71 and can be rotated to project through an aperture 67 in the top 39 of the housing to engage the underside 69 of the body 45 so as to raise the jig 37.

In FIG. 2, the jig 37 is shown in the lowered position, and in FIG. 3 the jig is shown as it is approaching the raised position. To lift the jig from the lowered to the raised positions, the shaft 71 is rotated in the clockwise direction (as viewed from the left hand side of FIG. 3) by the motor 72. Schematic part-sectional front views in FIGS. 4A through 4C illustrate operation of the camming mechanism 63 to raise and lower the jig 37.

Figure 4A:
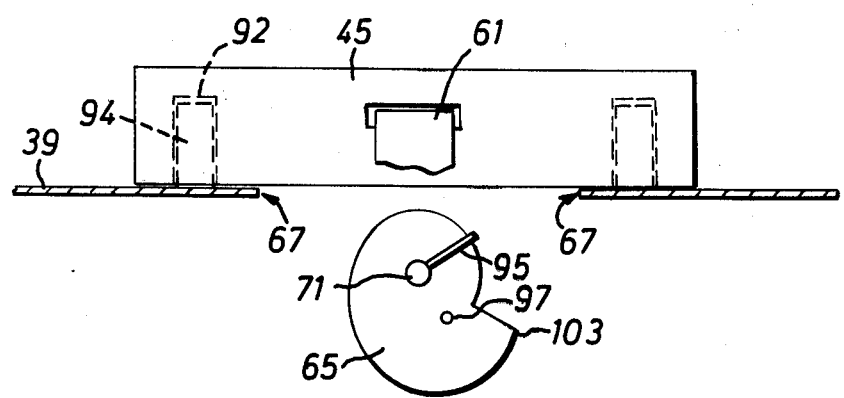
FIGS. 4A through 4C are schematic part-sectional front views of part of the apparatus of FIG. 2, illustrating operation of the camming mechanism in said apparatus.
Figure 4B:
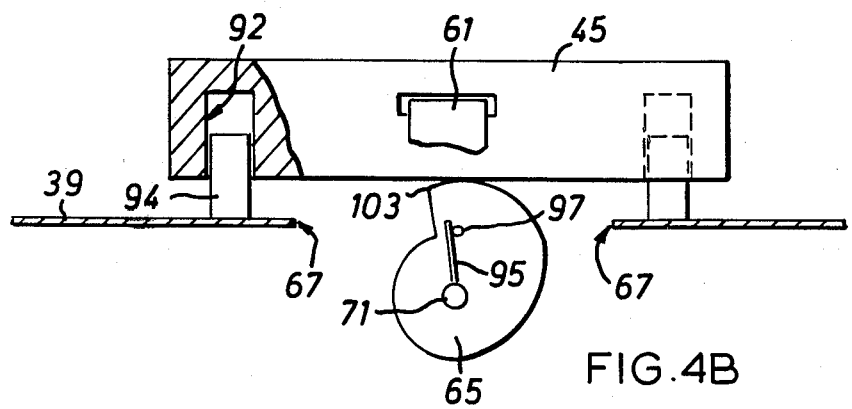
Figure 4C:
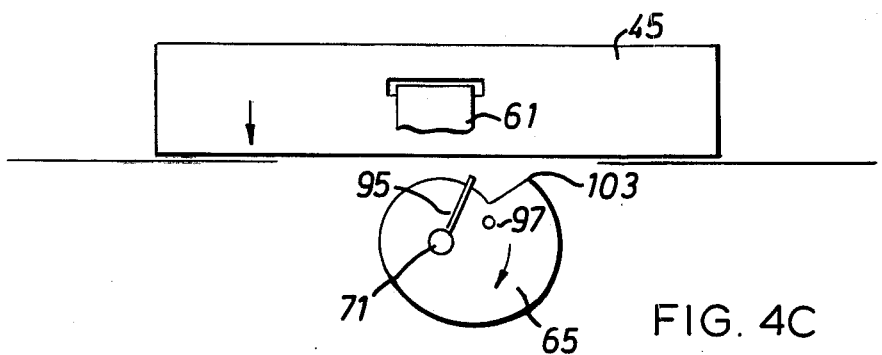

In FIG. 4A, the jig 37 is shown in the lowered position with the body 45 resting on the top 39 of the housing. The body 45 is located on the top 39 of the housing by means of upstanding cylindrical guide members 94 secured to the top 39 to either side of the aperture 67 and slidingly received in corresponding blind bores 92 extending upwardly through the body 45 from the underside 69 thereof. On rotation of the shaft 71 by the motor 72 (FIG. 3) in the clockwise direction (as seen in the drawing), a radially extending pin 95 projecting from the shaft 71 engages an axially extending pin 97 projecting from the side of the camming wheel 65 so that, on further rotation of the shaft, the camming wheel is rotated with the shaft. As the camming wheel is rotated by the shaft 71 and pins 95, 97, the wheel engages the underside 69 of the body 45 to lift the body on the guide members 94 into the raised position as illustrated in FIG. 4B. In this position, the jig is effectively latched with the profile of the camming wheel in contact with the underside 69 of the body 45 being such that the reaction at the point of contact therebetween is not in a direction such as to tend to cause rotation of the camming wheel. The jig can be released by slight further clockwise rotation of the camming wheel which causes the wheel to pass through its top-dead-center position (that is to say, the corner 103 of the camming wheel passes through the vertical perpendicular to the axis of rotation) so that the reaction at the point of contact between the camming wheel and body 45 is in a direction to drive the camming wheel further in the clockwise direction. Accordingly, the camming wheel, being freely rotatable on the shaft 71, accelerates rapidly in that direction allowing the jig 37 to fall substantially freely to its lowered position as illustrated in FIG. 4C.

It is to be noted that the rate of downward movement of the jig is substantially predictable, depending mainly upon the weight of the jig (of the order of 250 grams), and is not substantially affected by the speed with which the shaft 71 is rotated.

Referring again to FIG. 3, the mechanism further comprises first, second and third control cam wheels 85, 102, 99 fast with the shaft 71 for rotation therewith to control the operating cycle of the apparatus.

First control cam wheel 85 cooperates with microswitch 106 to control energization of the motor 72. More specifically, a first pair of contacts in the microswitch 106 connected in series with the power supply for the motor 72 are normally closed but open selectively on actuation of the micro-switch by engagement of the operating button thereof by a raised portion 93 on the periphery of the wheel 85. The wheel 85 is orientated on the shaft 71 relative to the pin 95 so that the micro-switch 106 is actuated to de-energize the motor when the jig is lifted to the raised position (FIG. 4B). A second pair of normally closed contacts in the microswitch 106 are connected in series with an indicator lamp 101 (FIG. 2) so that the indicator lamp also is normally energized but de-energized when the jig is in the raised position. A push button 81 (FIG. 2) is connected in parallel with the first pair of contacts of the micro-switch whereby the motor can be energized selectively by the operator when the jig is in the raised position and the micro-switch actuated.

It is to be noted that when the apparatus is initially switched on (at which time it can be assumed the jig will be in the lowered position as shown in FIG. 4A), the motor 72 is energized immediately and drives the shaft 71 until the jig 37 is lifted to the raised position. At this point the micro-switch 106 is actuated to stop the motor, and the jig can then remain thus latched in the raised position indefinitely. To start an operating cycle, push-button 81 is depressed to energize the motor 72, and held down for a sufficient time to allow the cam wheel 85 to be rotated to a position in which the raised portion 93 disengages from the operating button of the micro-switch 106. The push-button can then be released, power for the motor being supplied via micro-switch 106, and the shaft continues to rotate through a full cycle, first releasing and then lifting the jig as described with reference to FIGS. 4A-4C, until the micro-switch 106 is again actuated by cam wheel 85. Indicator lamp 101 is energized on de-actuation of the micro-switch 106 at the start of the cycle, thereby serving to indicate to the operator when the push-button 81 can be released, and de-energized at the end of the cycle.

Second control cam wheel 102 cooperates with a follower pin 78 which is coupled by means (not shown) with the spring-loaded support post 55 to withdraw the ferrule 13 from the blade 33 during certain parts of the operating cycle. More specifically, a camming surface 105 of the wheel 102 engages the follower pin 78 so as to move the post to the left (as seen in FIG. 3) on rotation of shaft 71 to lift the jig 37 from the lowered to the raised positions. Such movement of the follower pin 78 causes corresponding movement of the post 55 against the action of the above-mentioned spring mechanism (not shown), thereby withdrawing the end face 27 of the ferrule 13 from the cutting edge 31 (as shown in FIG. 3). As the shaft 71 and wheel 102 are further rotated to move the camming wheel 65 through the top-dead-center position, the follower pin 78 and post 55 are permitted to return to the right (as seen in FIG. 3) under the action of the spring mechanism. Accordingly, just before the point in the cycle at which the jig is released (as described with reference to FIG. 4B), the end face 27 of the ferrule is pressed into positive engagement with the cutting edge 31, and continues to be so engaged with the cutting edge as the jig is released and permitted to fall.

Third control cam wheel 99 cooperates with micro-switch 92 to energize the electric current source for heating the blade 33 during the appropriate part of the operating cycle. More specifically, the wheel 99 is formed with a camming surface having a raised portion 104 for actuating the micro-switch 92 selectively as the shaft 71 is rotated to move the camming wheel 65 through the top-dead-center position. Actuation of the micro-switch 92 energizes the electric current source for the blade 33, so that the blade is heated to the required cutting temperature on reaching that point in the cycle at which the jig 37 is released (as described with reference to FIGS. 4B and 4C).

To use the above-described apparatus for terminating an optical fibre, the free end of the fibre is first threaded through a ferrule 13 and secured against axial movement in the ferrule, as described above with reference to FIG. 1. Next, (and assuming the apparatus is already switched on with the jig latched in the raised position as described above) the ferrule is mounted in the jig by drawing the spring-loaded support post 55 backwardly by means of the handle 61, locating the ferrule with the shank portion 19 of the ferrule extending through the hole 53 of post 51 and the end 58 of the post 55 engaged in the annular groove 23 in the ferrule, and then releasing the handle 61. The ferrule is thus supported in the raised jig, with the free end 25 of the fibre 25 projecting from the end face 27 of the ferrule in a generally horizontal direction above the cutting edge 31, as shown in FIG. 3.

The cutting cycle is then initiated by depressing start button 81 until the indicator lamp 101 is illuminated. Depression of start button 81 energizes the motor 72 which rotates shaft 71 to cause the following sequence of events:

(1) micro-switch 106 is de-actuated to illuminate the indicator lamp 101 and maintain energization of motor 72 even if the start button is released;

(2) end face 27 is moved into engagement with the cutting edge 31 by the action of cam wheel 102 and follower pin 78;

(3) the current supply for the blade 33 is energized by the action of cam wheel 99 and micro-switch 92 thereby heating at least that portion of the blade adjacent the ferrule 13 to the required cutting temperature;

(4) the camming wheel 65 is driven through the top-dead-center position thereby releasing the jig 37 as described with reference to FIG. 4C.

(5) the jig 37 falls substantially freely under its own weight while the end face 27 of the ferrule 13 is pressed against the heated cutting edge 31, whereby the cutting edge is swept across that end face at a predictable rate to sever the fibre 23 substantially flush with that end face;

(6) the end face 27 is withdrawn from the blade 33 by the action of cam wheel 102 and follower pin 78;

(7) the camming wheel 65 continues to be rotated on re-engagement of pins 95 and 97 to lift the jig back up to the raised position (as illustrated in FIG. 3); and (8) micro-switch 106 is actuated by cam wheel 85 to de-energize motor 72 and xtinguish the indicator lamp 101.

This completes the cutting cycle and the ferrule 13 can be removed from the jig, the latter having been returned to the raised position ready for a new cycle.

Manners in which the cutting temperature and, to some extent, the cutting rate may be varied will be readily apparent to those skilled in the art. For example, the cutting temperature can be varied by altering the current supplied to the blade 33, or by altering the time delay between energization of the current supply for the blade and release of the jig 37. That time delay can be altered, for example, by altering the relative angular positions of the shaft 71 at which micro-switch 91 is actuated and camming wheel 65 passes through the top-dead-center position (e.g. by altering the angular position of cam wheel 99 on the shaft) or by altering the speed of the motor 72. Preferably, therefore, the synchronous drive motor 72 has a selectable speed.

The cutting rate depends mainly on the weight of the jig 37 and the height through which the jig is permitted to fall before the cutting edge 31 impinges on the fibre 23. The latter can be varied by varying the height of the cutting edge 31 relative to the height of the bore in the ferrule 13 when the camming wheel 65 passes through the top-dead-center position.

It will be appreciated that the apparatus described is of uncomplicated construction and of inexpensive manufacture. Moreover, the apparatus is simple to use and the values of the two parameters having greatest influence on the optical qualities of the end of the fibre severed by the apparatus, namely the cutting temperature and the cutting rate, are closely predictable. Accordingly, the apparatus can be used by unskilled operators to provide an optical fibre with a severed end having repeatable good optical transmission qualities and which is accurately flush with the plane end-face of a connecting ferrule.

It is particularly to be noted that in the apparatus described the blade is heated to a temperature substantially above the softening range of the optical fibre. The high temperature of the blade causes rapid local melting of the fibre material directly in contact with the blade. Accordingly, the blade can pass through the material of the fibre with a minimum of resistance (thereby minimizing the stress to which the fibre is subjected) and the cut end surface of the fibre is superficially melted to provide a smooth stress-relieved surface with good optical transmission qualities. The cutting rate is sufficiently rapid, however, to avoid a significant temperature rise in the bulk of the material of the fibre despite the high blade temperature, thereby avoiding deformation or discolouration of the fibre end owing to excessive melting or thermal decomposition of the material of the fibre.

It will also be appreciated that the described method for terminating an optical fibre provides a termination for the fibre in which the end of the fibre is cut accurately in a plane orthogonal to the axis of the fibre and the cut end is accurately located in the axial direction relative to the ferrule attached thereto, and particularly relative to the annular shoulder 21 of the ferrule. The significance of this feature relates to the fact that efficient optical coupling between the ends of two interconnected fibres is critically dependant upon the separation and alignment of those ends: the end faces of the fibres should be accurately parallel and as close together as possible without actually touching. Metal ferrules of the type illustrated can be manufactured to close tolerances, particularly with regard to the diameter of the bore 15, the concentricity of that bore with the cylindrical surface of the portion 19 of the ferrule, the orthogonality of the end face 27 to the axis of the bore, and the axial separation of that end face from the annular shoulder 21. Accordingly, two optical fibres terminated by the method described can readily be secured in accurate alignment and close spacing by locating and securing the respective ferrules with their respective portions 19 coaxially disposed and their respective shoulders 21 accurately spaced. This may be accomplished, for example, by inserting the respective portions 19 in opposite ends of a spacer tube having a bore which is a close sliding fit about those portions and a length equal to the required spacing between the shoulders.

We claim:

1. A method of terminating optical fibre means comprising the steps of:
   (a) threading the optical fibre means through a tubular ferrule so that said fibre means projects from an end face of said ferrule;
   (b) heating the cutting edge of cutting means to a temperature in excess of the softening range of the material of said optical fibre means; and
   (c) sweeping the said cutting edge across the said end face and in engagement therewith to sever said fibre means substantially flush with said end face.

2. A method as claimed in claim 1, wherein said cutting edge is swept across the said end face at a predetermined rate.

3. A method as claimed in claim 2, wherein said cutting edge is swept across the said end face under the action of a falling weight.

4. A method as claimed in claim 3, wherein said cutting means is fixed with said cutting edge uppermost and said ferrule is received by a jig which can be raised to a position with said bore extending in a generally horizontal direction above the line of said cutting edge and said end face extending generally vertically and in engagement with said cutting edge, and wherein said cutting edge is swept across said end face to sever said fibre means by permitting said jig to fall substantially freely to a lower position in which said bore extends generally in a horizontal direction below the line of said cutting edge.

5. Apparatus for terminating optical fibre means comprising:
   (a) cutting means formed with a cutting edge;
   (b) a jig adapted to receive a tubular ferrule and mounted for movement, relative to said cutting edge, between first and second positions with an end face of a ferrule received therein in sliding engagement with said cutting edge;
   (c) heating means for heating said cutting edge to a temperature in excess of the softening range of the material of the fibre means; and
   (d) drive means operable to move said jig from said second to said first position against the action of a bias force and then to release said jig to permit said jig to return to said second position whereby in use to sweep said cutting edge across the end face of the ferrule received in said jig.

6. Apparatus as claimed in claim 5, wherein said cutting means is fixed with said cutting edge uppermost, said first and second positions are upper and lower positions respectively, and said bias force is provided by the weight of said jig.

7. Apparatus as claimed in claim 6, wherein said jig is adapted to receive the tubular ferrule with the bore thereof extending in a generally horizontal direction which is above and below the line of said cutting edge when said jig is in said upper and lower positions respectively.

8. Apparatus as claimed in claim 5, wherein said jig includes a spring mechanism adapted to press the end face of a ferrule received therein against said cutting edge whereby to maintain positive sliding engagement therebetween.

9. Apparatus as claimed in claim 5, wherein said cutting means comprises a metal blade and said heating means comprises an electric current source connected with said blade and adapted to pass a current therethrough sufficient to heat said cutting edge to the said temperature.

10. Apparatus as claimed in claim 6, wherein said drive means comprises a drive shaft extending beneath said jig, a camming wheel rotatably mounted on said shaft and rotatable to a top-dead-center position to engage with and lift said jig from said second to said first positions, and means projecting from said drive shaft to engage said camming wheel on rotation of said shaft so as to rotate said camming wheel to said top-dead-center position and on further rotation of said shaft to push said camming wheel through said top-dead-center position so that said camming wheel can continue rotation freely under the action of the weight of said jig to permit said jig to fall back to said first position.

* * * * *